(12) United States Patent
Ohba et al.

(10) Patent No.: US 6,449,552 B2
(45) Date of Patent: Sep. 10, 2002

(54) DRIVING FORCE DISTRIBUTION CONTROL APPARATUS AND METHOD OF MOTOR VEHICLE

(75) Inventors: Mitsuru Ohba; Kenji Arai, both of Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/813,028

(22) Filed: Mar. 21, 2001

(30) Foreign Application Priority Data

Mar. 23, 2000 (JP) ........................................ 2000-081930

(51) Int. Cl.[7] .............................. B60T 7/12; G06F 1/00
(52) U.S. Cl. .............................. 701/89; 701/69; 701/90
(58) Field of Search .............................. 701/89, 82, 84, 701/86, 87, 90, 69; 180/197

(56) References Cited

U.S. PATENT DOCUMENTS

| | | | | |
|---|---|---|---|---|
| 4,974,694 A | * | 12/1990 | Matsumoto | 180/197 |
| 4,986,388 A | * | 1/1991 | Matsuda | 180/248 |
| 5,010,974 A | * | 4/1991 | Matsuda | 180/233 |
| 5,097,921 A | * | 3/1992 | Tezuka | 180/197 |
| 5,262,950 A | * | 11/1993 | Nakayama | 701/89 |
| 5,270,930 A | * | 12/1993 | Ito et al. | 701/89 |
| 5,631,829 A | * | 5/1997 | Takasaki et al. | 701/89 |

FOREIGN PATENT DOCUMENTS

| | | |
|---|---|---|
| JP | 63-203429 | 8/1988 |
| JP | 6-247181 | 9/1994 |

\* cited by examiner

*Primary Examiner*—Richard M. Camby
(74) *Attorney, Agent, or Firm*—Oblon, Spivak, McClelland, Maier & Neustadt, P.C.

(57) ABSTRACT

A driving force control apparatus of a motor vehicle including a first set of drive wheels and a second set of drive wheels, e.g., front wheels and rear wheels, which are driven with respective driving forces that are controlled independently of each other. The control apparatus calculates an actual slip rate difference between a slip rate of the first set of drive wheels and that of the second set of drive wheels, and controls distribution of driving force between the first set of wheels and the second set of wheels, based on the slip rate difference.

24 Claims, 7 Drawing Sheets

DRIVING FORCE DISTRIBUTION CONTROL APPARATUS AND METHOD OF MOTOR VEHICLE

INCORPORATION BY REFERENCE

The disclosure of Japanese Patent Application No. 2000-081930 filed on Mar. 23, 2000 including the specification, drawing and abstract is incorporated herein by reference in its entirety.

BACKGROUND OF THE INVENTION

1. Field of the Invention

The invention relates to a driving force distribution control apparatus and method of a motor vehicle including a first set of drive wheels and a second set of drive wheels whose driving forces can be respectively controlled.

2. Description of the Background

There are known vehicles each including a first set of drive wheels and a second set of drive wheels whose driving forces can be controlled independently of each other. Examples of such vehicles are four-wheel drive vehicles in which a selected one or ones of an internal combustion engine, an electric motor and a hydraulic motor that function as driving motors is/are provided separately for the front wheels and the rear wheels, and four-wheel drive vehicles in which the driving force transmitted from a single driving motor to the front wheels and the rear wheels is distributed between the front and rear wheels by a torque distribution control clutch.

In the vehicles as described above, the distribution of driving force between the first set of drive wheels and the second set of drive wheels is carried out based on a difference in the rotational speed between the first drive wheels and the second drive wheels. An example of a drive force distribution control apparatus that performs the above function is disclosed in Japanese Laid-open Patent Publication No. SHO 63-203429. The driving force distribution control apparatus as disclosed in this publication is adapted to determine no-load or slipping rotation of a wheel(s) based on a difference between the front wheel rotational speed and the rear wheel rotational speed. Upon detection of such slipping wheel rotation, the apparatus performs distribution of the driving force by reducing the driving force for the drive wheels at which no-load or slipping rotation was detected, and simultaneously increasing the driving force for the drive wheels at which no-load or slipping rotation was not detected. With this arrangement, the driving force of the vehicle is further increased, for example, in the case where the vehicle runs on a road surface with a low road surface friction coefficient, such as an icy road, a compressed-snow road, or the like.

In the aforementioned driving force distribution control apparatus, the difference between the front-wheel rotational speed and the rear-wheel rotational speed used as a basis for control of the distribution of driving force between the drive wheels does not always sufficiently reflect the state (e.g., running conditions) of the vehicle. For example, even if the rotational speed difference is the same, the slip states of the drive wheels may differ to a great extent at different vehicle speeds. If the rotational speed difference is equal to, for example, 50 $min^{-1}$ (rpm), the wheel slip rate and the longitudinal force and lateral force differ between the case where the vehicle speed is 50 km/h and the case where the vehicle speed is 100 km/h, resulting in different degrees of vehicle running stability. Therefore, the aforementioned driving force distribution control apparatus may not be able to ensure a sufficiently high maneuverability.

SUMMARY OF THE INVENTION

It is therefore an object of the invention to provide a vehicular driving force distribution control apparatus wherein the vehicle running state is more accurately reflected by the distribution of driving force between drive wheels.

To accomplish the above object and other objects, the invention provides a driving force control apparatus of a motor vehicle including a first set of drive wheels and a second set of drive wheels which are driven with respective driving forces that are controlled independently of each other, which apparatus includes (1) a slip rate difference calculating unit that calculates an actual slip rate difference between a slip rate of the first set of drive wheels and that of the second set of drive wheels, and (2) a driving force distribution control unit that controls distribution of driving force between the first set of wheels and the second set of wheels, based on the slip rate difference calculated by the slip rate difference calculating unit.

In the driving force control apparatus as described above, the driving force distribution control unit controls the distribution of the driving force between the first set of drive wheels and the second set of drive wheels, based on the slip rate difference calculated by the slip rate difference calculating unit. Thus, since the vehicle running state or condition is more accurately reflected by the distribution of the driving force between the drive wheels, the driving force can be more appropriately distributed between the drive wheels, thus assuring a sufficiently high level of vehicle maneuverability.

BRIEF DESCRIPTION OF THE DRAWINGS

The foregoing and further objects, features and advantages of the invention will become apparent from the following description of a preferred embodiment with reference to the accompanying drawings, wherein like numerals are used to represent like elements and wherein.

DETAILED DESCRIPTION OF PREFERRED EMBODIMENTS

A presently preferred embodiment of the invention will be described in detail with reference to the accompanying drawings.

Figure 1:
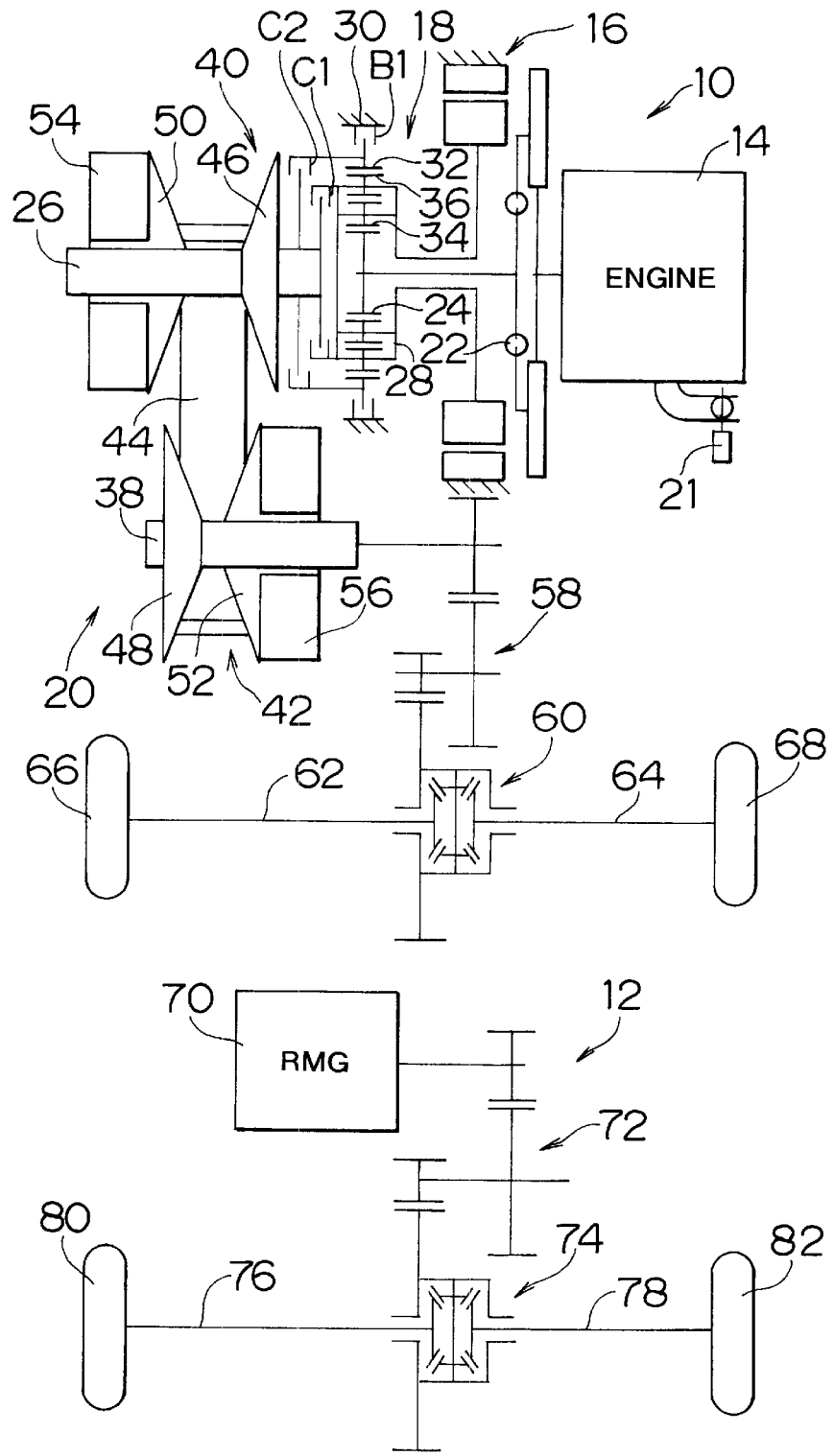
FIG. 1 is a schematic diagram illustrating the construction of a power transmission apparatus of a four-wheel drive vehicle including a control apparatus according to one embodiment of the invention.

FIG. 1 is a schematic diagram illustrating the construction of a power transmission apparatus of a four-wheel drive vehicle (i.e., a front/rear wheel drive vehicle) to which the invention is applied. The front/rear wheel drive vehicle is of the type in which a front wheel system is driven by a primary drive unit (or a first drive unit) 10 including a first driving motor, and a rear wheel system is driven by a secondary drive unit (or a second drive unit) including a second driving motor.

The primary drive unit 10 has an internal combustion engine 14 that is operated by utilizing combustion of an air-fuel mixture, a motor-generator (hereinafter, referred to as "MG") 16 that selectively functions as an electric motor or a generator, a double pinion type planetary gear device 18, and a continuously variable transmission 20 capable of continuously changing the speed ratio. These components of the primary drive unit 10 are concentrically arranged on the same axis. The engine 14 serves as a first driving motor, or a primary driving motor. The engine 14 is equipped with a throttle actuator 21 for driving a throttle valve that controls the amount of intake air flowing through an intake pipe of the engine 14, in order to change the opening THA of the throttle valve.

The planetary gear device 18 is a force combining/distributing mechanism that mechanically combines or distributes force. The planetary gear device 18 has three rotary elements that are independently and rotatably disposed about a common axis, namely, a sun gear 24 connected to the engine 14 via a damper device 22, a carrier 28 connected to an input shaft 26 of the continuously variable transmission 20 via a first clutch C I and connected to an output shaft of the MG 16, and a ring gear 32 connected to the input shaft 26 of the continuously variable transmission 20 via a second clutch C2 and connected to a non-rotational member, for example, a housing 30, via a brake B1. The carrier 28 supports a pair of pinions (planetary gears) 34, 36 that mesh with the sun gear 24 and the ring gear 32 and mesh with each other, such that the pinions 34, 36 are rotatable about their own axes.

The planetary gear device 18 and the MG 16 connected to the carrier 28 constitute an electric torque converter (ETC). When the engine 14 is being operated (rotated) with the sun gear 24 rotating, the ETC controls the quantity of electricity generated by the MG 16 (i.e., causes gradually increasing reaction force, i.e., torque for regeneratively driving the MG 16, to be generated at the carrier 28), thereby to smoothly increase the speed of rotation of the ring gear 32 from zero to a desired speed. In this manner, the vehicle can be smoothly started and accelerated. Assuming that the gear ratio ρ (the number of teeth of the sun gear 24/the number of teeth of the ring gear 32) of the planetary gear device 18 is, for example, an ordinary value of 0.5, the torque of the engine 14 is amplified by 1/ρ times, for example, about 2 times, before it is transmitted to the continuously variable transmission 20, in view of (the relationship of the torque of the ring gear 32:the torque of the carrier 28: the torque of the sun gear 24)=1/ρ:(1−ρ)/ρ:1. Thus, the operating mode in which the engine 14 is operating with the clutch C2 being engaged (the ring gear 32 being coupled with the input shaft 26 of the CVT 20) is called "torque amplifying mode".

The continuously variable transmission 20 includes a pair of variable pulleys 40, 42 having variable effective diameters and provided on;the input shaft 26 and an output shaft 38, respectively, and an endless or loop-like transmission belt 44 provided on the pulleys 40, 42. Each of the pulleys 40, 42 has an axially X5 fixed rotary member 46 or 48 fixedly mounted on the input shaft 26 or the output shaft 38, and an axially movable rotary member 50 or 52 which rotates together with the input shaft 26 or the output shaft 38 but is movable in the axial direction relative to the input or output shaft 26, 38. The fixed rotary member 46, 48 cooperates with the corresponding movable rotary member 50, 52 to define a V-shaped groove therebetween. The variable pulleys 40, 42 further include respective hydraulic cylinders 54, 56 which apply thrust force to the appropriate movable rotary member 50, 52 to change the effective diameters of the variable pulleys 40, 42 at which the belt engages with the pulleys, thereby to change the speed ratio γ (=the speed of rotation of the input shaft /the speed of rotation of the output shaft).

The torque received from the output shaft 38 of the continuously variable transmission 20 is transmitted to the pair of front wheels 66, 68 via a speed reduction gear device 58, a differential gear device 60, and a pair of axles 62, 64. In this embodiment, a steering wheel for changing the steering angle of the front wheels 66, 68 is not illustrated in FIG. 1.

The secondary drive unit 12 includes a rear motor-generator (hereinafter, referred to as "RMG") 70 that functions as a second driving motor, or a secondary driving motor. The torque generated by the RMG 70 is transmitted to a pair of rear wheels 80, 82 via a speed reduction gear device 72, a differential gear device 74, and a pair of axles 76, 78, respectively.

Figure 2:
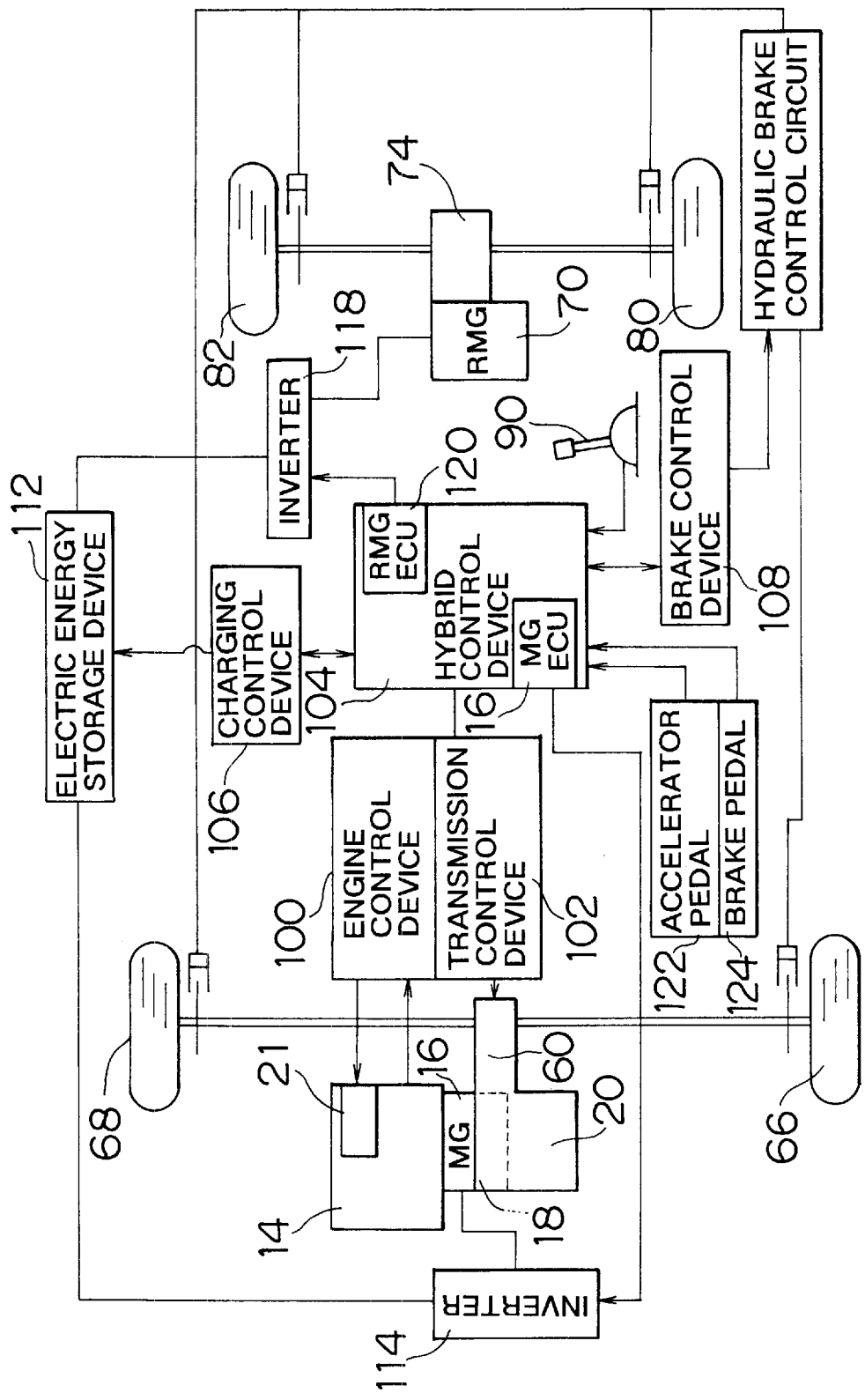
FIG. 2 is a diagram illustrating the construction of the control apparatus provided in the four-wheel drive vehicle of FIG. 1.

FIG. 2 is a diagram illustrating the construction of a control apparatus provided in the front/rear wheel drive vehicle of this embodiment. An engine control device 100, a transmission control device 102, a hybrid control device 104, a charging control device 106 and a brake control device 108 are in the form of microcomputers each having a CPU, a RAM, a ROM and an input/output interface. In each control device, the CPU processes input signals and performs various control operations in accordance with programs stored in advance in the ROM, while utilizing the temporary storage function of the RAM. The aforementioned control devices are connected to each other for mutual communications. When one of the control devices requests a necessary signal, another control ,device, which receives the request, transmits the signal as needed to the above-indicated one control device. The hybrid control device 104 also functions as a driving force distribution control device that appropriately distributes the driving force between the front wheels 66, 68 and the rear wheels 80, 82 by controlling the output torque of the RMG 70.

The engine control device 100 performs controls on the engine 14. For example, the engine control device 100 controls fuel injection valves (not shown) for controlling the amount of fuel injected, and controls igniters (not shown) for controlling the ignition timing. During traction control, the engine control device 100 also controls the throttle actuator 21 to temporarily reduce the output of the engine 14 so that the slipping front wheels 66, 68 will grip the road surface.

The transmission control device 102 sets the tension of the transmission belt 44 of the continuously variable transmission 20 to an optimal value by controlling a pressure regulator valve for regulating the belt tension pressure. The pressure regulator valve is controlled based on the actual speed ratio γ and the transmission torque, that is, the output torque of the engine 14 and the MG 16, in accordance with a pre-set relationship that renders the tension of the transmission belt 44 at a required and sufficient value. Also, the transmission control device 102 determines a target speed ratio γm based on the actual vehicle speed V, and the engine load, for example, the throttle opening THA or the accelerator pedal operation amount ACC, in accordance with a pre-stored relationship that causes the engine 14 to operate in accordance with a minimum fuel consumption rate curve or an optimal curve. Then, the transmission control device 102 controls the speed ratio γ of the continuously variable transmission 20 so that the actual speed ratio γ becomes equal to the target speed ratio γm.

The engine control device 100 and the transmission control device 102 control the throttle actuator 21 and the amount of fuel injected, for example, and change the speed ratio γ of the continuously variable transmission 20 so that the operating or driving point of the engine 14 moves along, for example, a well-known optimal fuel consumption rate operating or driving line. Furthermore, the engine control device 100 and the transmission control device 102 control the throttle actuator 21 and change the speed ratio γ, thereby to move the driving point of the engine 14, in order to change the output torque TE or revolution :speed NE of the engine 14 in response to a command from the hybrid control device 104.

The hybrid control device 104 includes an MG control unit 116 for controlling an inverter 114 that controls drive current supplied to the MG 16 from an electric energy storage device 112 formed by a battery or the like, and controls current generated by the MG 16 and outputted to the storage device 112. The hybrid control device 104 further includes an RMG control unit 120 for controlling an inverter 118 that controls drive current supplied from the storage device 112 to the RMG 70 and also controls current generated by the RMG 70 and outputted to the storage device 112. The hybrid control device 104 selects one of a plurality of operating modes, including an ETC mode, a lock-up mode, a motor running mode and other modes, based on the operated position PSH of a shift lever 90, the throttle opening θ (the operation amount ACC of an accelerator pedal 122), the vehicle speed V, and the state of charge SOC of the storage device 112. Furthermore, based on the accelerator pedal operation amount ACC and the operation amount BF of a brake pedal 124, the hybrid control device 104 selects a regenerative braking mode in which braking force is generated by torque needed for the MG 16 or the RMG 70 to generate electric power, or an engine brake mode in which braking force is generated by torque that is resistant to rotation of the engine 14.

The charging control device 106 charges or feeds electric energy to the storage device 112, which electric energy is generated by the MG 16 or the RMG 70, when the amount of electric energy SOC (i.e., state of charge) stored in the storage device 112, such as a battery or a capacitor, becomes lower than a preset lower limit $SOC_D$. When the amount of stored electric energy SOC exceeds a preset upper limit $SOC_U$, the charging control device 106 inhibits charging of the storage device 112 with the electric energy from the MG 16 or the RMG 70. Furthermore, if, at the time of charging, the actual electric power estimated value Pb (=generated power $P_{MG}$+consumed power $P_{RMG}$ (negative)) comes out of the range between an input limit value $W_{IN}$ and an output limit value $W_{OUT}$ of electric power or energy that are functions of the temperature TB of the storage device 112, the charging control device 106 inhibits electric power or energy from being fed to or from the storage device 112.

The brake control device 108 controls wheel brakes provided for the respective wheels 66, 68, 80, 82 via a hydraulic brake control circuit, to perform, for example, TRC control, ABS control, VSC control and so forth, so as to increase the vehicle stability or increase the tractive force at the time of starting, braking or turning on a low-μ road, or the like.

Figure 3:
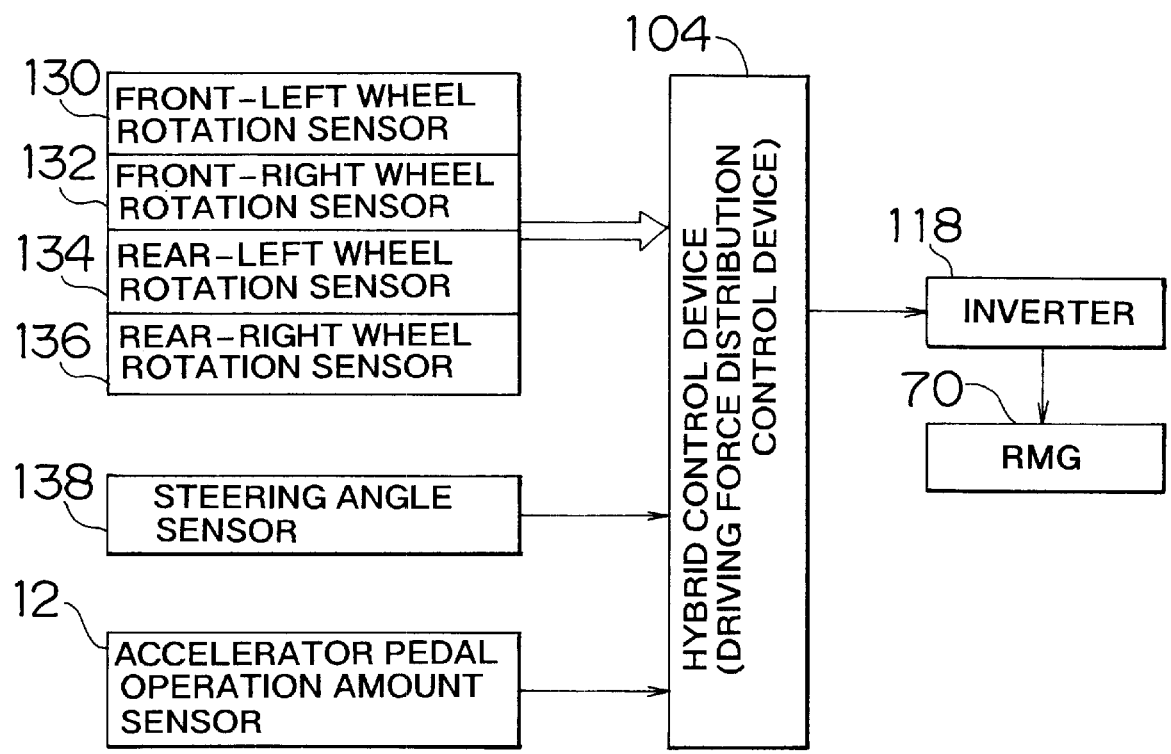
FIG. 3 is a diagram illustrating the construction of a portion of the control apparatus provided in the four-wheel drive vehicle of FIG. 1.
Figure 4:
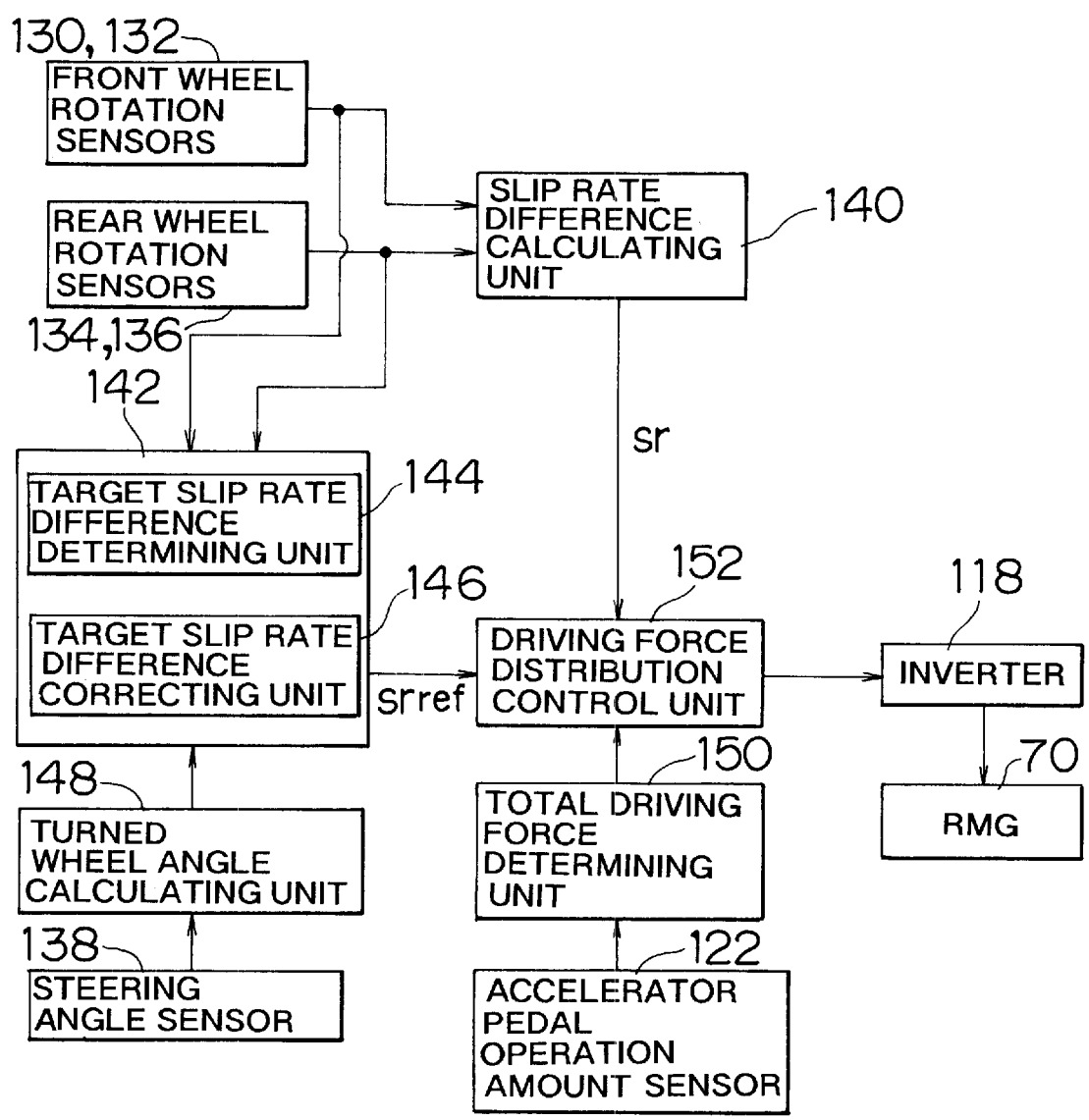
FIG. 4 is a function block diagram useful for explaining principal control functions of the control apparatus shown in FIG. 3.

FIG. 3 shows the construction of a portion of the hybrid control device 104 that functions as a driving power distribution control device, and FIG. 4 is a function block diagram useful for explaining the principal functions of the power distribution control device. Referring to FIG. 3, the hybrid control device 104 calculates a front wheel rotation speed $n_f$ (rpm) by obtaining the average of the rotation speed of the front-left wheel 66 and the rotation speed of the front-right wheel 68 supplied from a front-left wheel rotation sensor 130 and a front-right wheel rotation sensor 132, and calculates a rear wheel rotation speed $n_r$ (rpm) by obtaining the average of the rotation speed of the rear-left wheel 80 and the rotation speed of the rear-right wheel 82 supplied from a rear-left wheel rotation sensor 134 and a rear-right wheel rotation sensor 136. Then, the hybrid control device 104 calculates an actual slip rate difference sr between the front wheels 66, 68 and the rear wheels 80, 82 based on the front wheel rotation speed $n_f$ and the rear wheel rotation speed $n_r$, in accordance with a pre-stored relationship (as represented by mathematical expression (1)). The hybrid control device 104 then controls the output torque of the RMG 70, that is, the torque for driving the rear wheels 80, 82 in accordance with a pre-stored relationship (as represented by mathematical expression (4)), so as to eliminate a deviation of the actual slip rate difference sr from a predetermined target slip rate difference $sr_{ref}$. Since the total driving force of the vehicle, that is, the total drive torque TD, is determined based on the accelerator pedal operation amount ACC, the hybrid control device 104 controls the output torque of the RMG 70 in accordance with a rear-wheel output torque value obtained by multiplying the total drive torque TD by a rear-wheel required torque distribution ratio $sk_{tr}$. Furthermore, when the hybrid control device 104 receives a steering angle δ (degrees), that is, an operation amount of a steering wheel (not shown), from a steering angle sensor 138, the control device 104 calculates a turned wheel angle θ (=δ/GR) by dividing the steering angle δ by the steering gear ratio GR, and then calculates a target slip rate difference $sr_{ref}$ based on the turned wheel angle θ in accordance with a pre-stored relationship (as represented by mathematical expression (3)).

Referring to FIG. 4, a slip rate difference calculating unit 140 calculates an actual slip rate difference sr between the drive wheels, that is, a difference between the slip rate of the front wheels 66, 68 and the slip rate of the rear wheels 80, 82, from the following mathematical expression (1), based on the front wheel rotation speed $n_f$ and the rear wheel rotation speed $n_r$.

$$sr=(n_f-n_r)/n_h \qquad (1)$$

The above-indicated mathematical expression 1 is derived as follows. Where "r" is wheel radius, "$\omega_f$" is angular speed of the front wheels 66, 68, "$\omega_r$" is angular speed of the rear wheels 80, 82, and "V" is vehicle speed, the slip rate of the front wheels 66, 68 is represented by $(r\omega_f-V)/r\omega_f$, and the slip rate of the rear wheels 80, 82 is represented by $(r\omega_r-V)/r\omega_r$. Therefore, the front-rear wheel slip rate difference sr is equal to $(V\omega_f-V\omega_r)/r\omega_f\omega_r$. Where "$\omega_h$" is angular velocity of the faster ones of the front and rear wheels, and "$\omega_l$" is angular velocity of the slower ones of the front and rear wheels, substitution of an approximate expression $V=r\omega_l$ in the above-indicated expression gives $sr=(\omega_f-\omega_r)/\omega_h$. By substituting the angular velocity 107 in this expression with the rotation speed, the above-indicated mathematical expression (1) is obtained.

Figure 5:
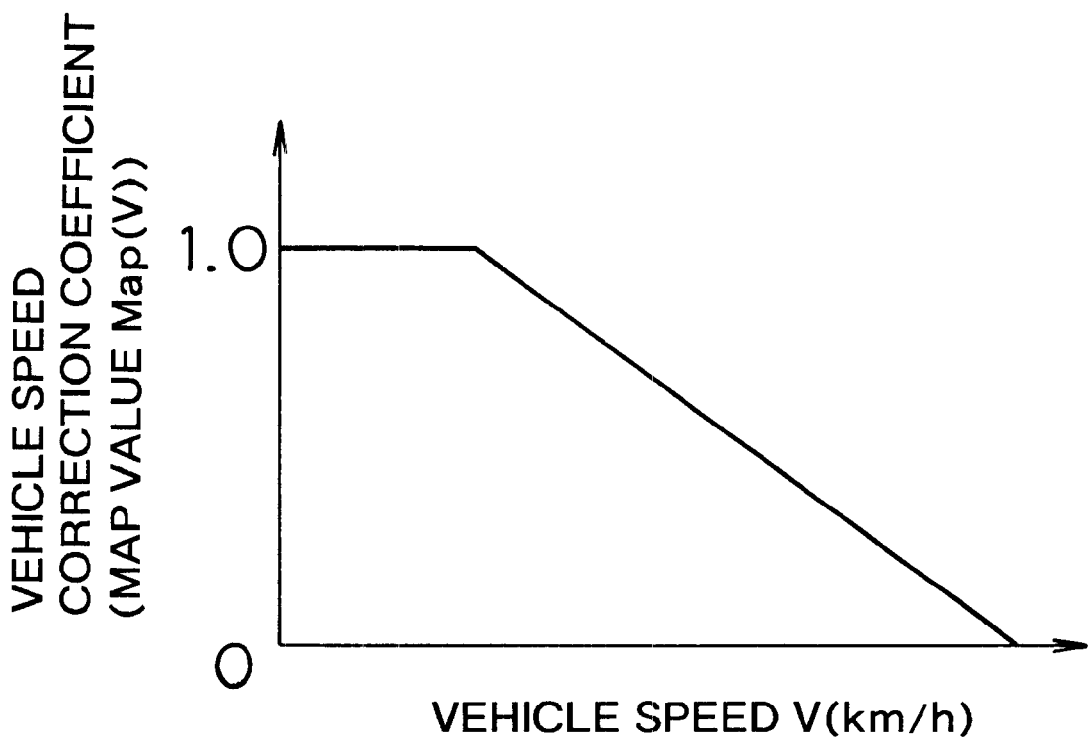
FIG. 5 is a graph indicating a relationship used in the control apparatus of FIG. 3 for determining a vehicle speed correction coefficient for correcting a target slip rate difference.

A target slip rate difference calculating unit 142 includes a target slip rate difference determining unit 144 and a target slip rate difference correcting unit 146. The target slip rate difference calculating unit 142 calculates a target slip rate difference $sr_{ref}$ according to pre-stored relationships, based on the actual turned wheel angle θ of the front wheels 66, 68 and the vehicle speed V. Initially, the target slip rate difference determining unit 144 determines a target slip rate difference $sr_{ref}$ based on the turned wheel angle θ of the front wheels 66, 68, in accordance with a pre-stored relationship as represented by, for example, mathematical expression (2). The turned wheel angle θ(=δ/GR) of the front wheels 66, 68 is an angle of inclination of the front wheels 66, 68 with respect to the traveling direction of the vehicle, and is determined by a turned wheel angle calculating unit 148 that divides the steering angle δ detected by the steering angle sensor 138 by the steering gear ratio GR. Next, the target slip rate difference correcting unit 146 determines a vehicle speed correction coefficient, that is, map value Map(V), based on the actual vehicle speed V, in accordance with a pre-stored relationship as indicated in FIG. 5 by way of example. Then, the target slip rate difference correcting unit 146 corrects the target slip rate difference $sr_{ref}$ by multiplying the target slip rate difference $sr_{ref}$ by the vehicle speed correction coefficient, that is, the map value Map(V). As the vehicle speed V, the lower value $n_l$ of the front wheel rotation speed $n_f$ and the rear wheel rotation speed $n_r$ may be used.

The relationship as expressed by mathematical expression (2) below is determined so that the target slip rate difference $sr_{ref}$ is equal to zero while the vehicle is traveling straight. While the vehicle is turning, a slip rate difference sr between the front and rear wheels, if actually calculated according to the mathematical expression (1), is inevitably present (i.e., is not equal to zero) even if no slip occurs, and the slip rate difference sr thus obtained increases with an increase in the turned wheel angle θ. The relationship as represented by the expression (2) is determined so as to eliminate the slip rate difference sr that inevitably appears during a turn of the vehicle. In the relationship as expressed by mathematical expression (3), the correction coefficient (=Map(V)) is a value ranging from zero to 1. The relationship as indicated in FIG. 5 is pre-set so that the correction coefficient decreases with an increase in the vehicle speed, in view of the fact that as the vehicle speed increases, the center of turns that lies on the axis of rotation of the rear wheels shifts or moves toward the front wheels and the target slip rate difference $sr_{ref}$ becomes excessively large.

$$sr_{ref}=(1-\cos\theta) \quad (2)$$

$$sr_{ref}=(1-\cos\theta)\cdot Map(V) \quad (3)$$

A total driving force determining unit 150 calculates a total driving force or a total drive torque (=f(ACC)) that is needed for driving the vehicle, based on the accelerator pedal operation amount ACC detected by the accelerator pedal operation amount sensor 123, in accordance with a pre-set relationship that is a function of the accelerator pedal operation amount ACC.

A driving force distribution control unit 152 calculates a rear-wheel required torque distribution ratio $sk_{tr}$ based on the actual front-rear wheel slip rate difference sr, according to a pre-stored control expression as represented by, for example, mathematical expression (4) below. Furthermore, by multiplying the rear-wheel required torque distribution ratio $sk_{tr}$ by the total drive torque, the driving force distribution control unit 152 calculates an output torque value of the RMG 70, that is, a drive torque value of the rear wheels 80, 82. Then, the driving force distribution control unit 152 causes the RMG 70 to drive the rear wheels 80, 82 so as to achieve the drive torque value thus obtained. Namely, the driving force distribution control unit 152 controls the driving force distribution ratio by adjusting the drive torque of the rear wheels 80, 82 within a range in which the total drive torque remains unchanged. The mathematical expression (4) as indicated below is a control expression that includes a feed-forward term and PID feedback terms, where $sk_{wr}$ is a feed-forward term and represents a dynamic rear-wheel load distribution ratio. For example, the value $sk_{wr}$ is calculated based on the longitudinal G (acceleration) of the vehicle detected by a longitudinal G sensor or calculated from the wheel rotational acceleration. Furthermore, in the expression (4), "e" represents control deviation (=$sr_{ref}$−sr), "P" represents a proportional constant (proportional control gain), "D" represents a differential constant (differential control gain), and "I" represents an integral constant (integral control gain).

$$sk_{tr}=sk_{wr}+P\cdot e+D\cdot de/dt+I\cdot \int edt \quad (4)$$

Figure 6:
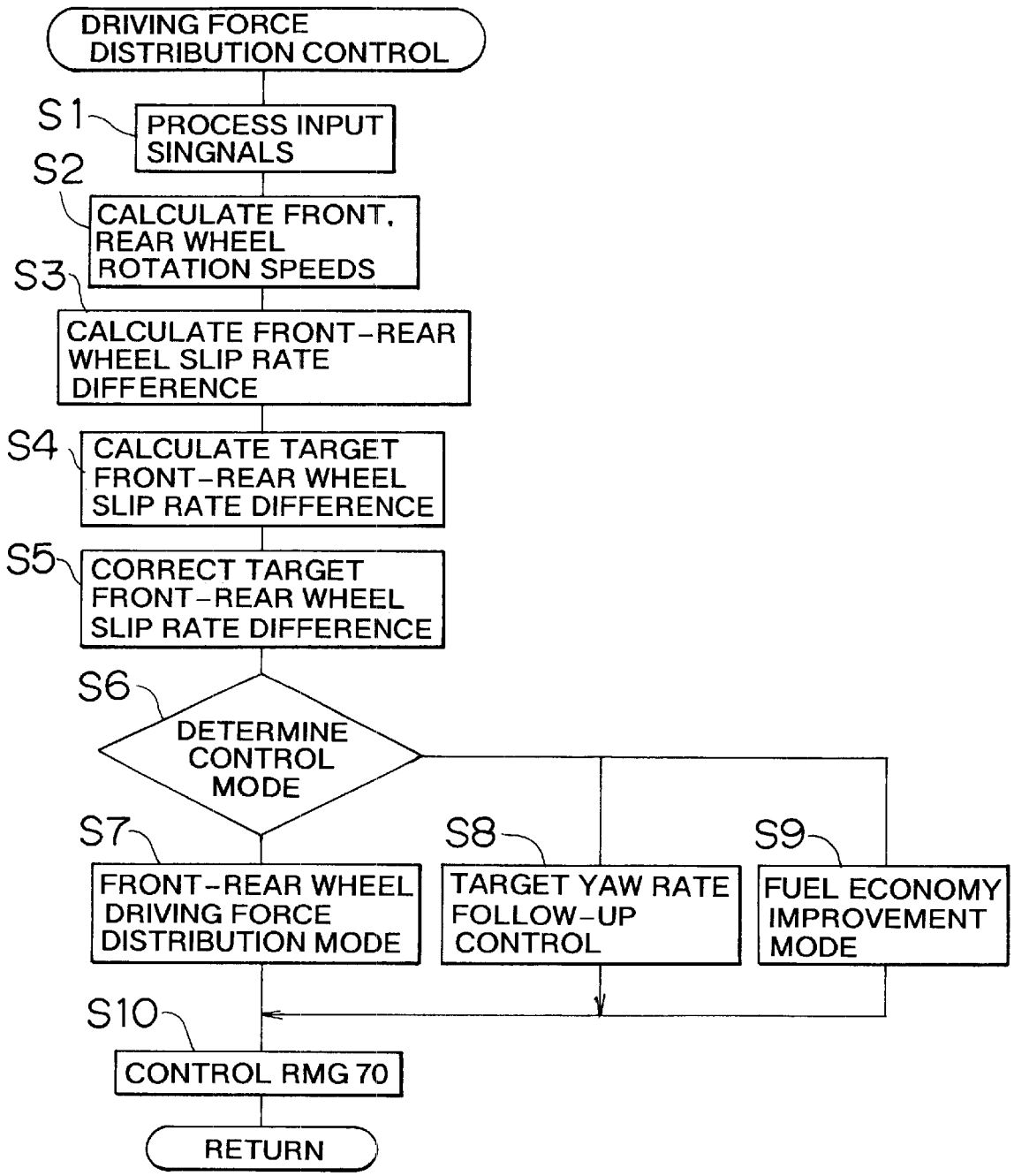
FIG. 6 is a flowchart illustrating a control operation of the control apparatus of FIG. 3.
Figure 7:
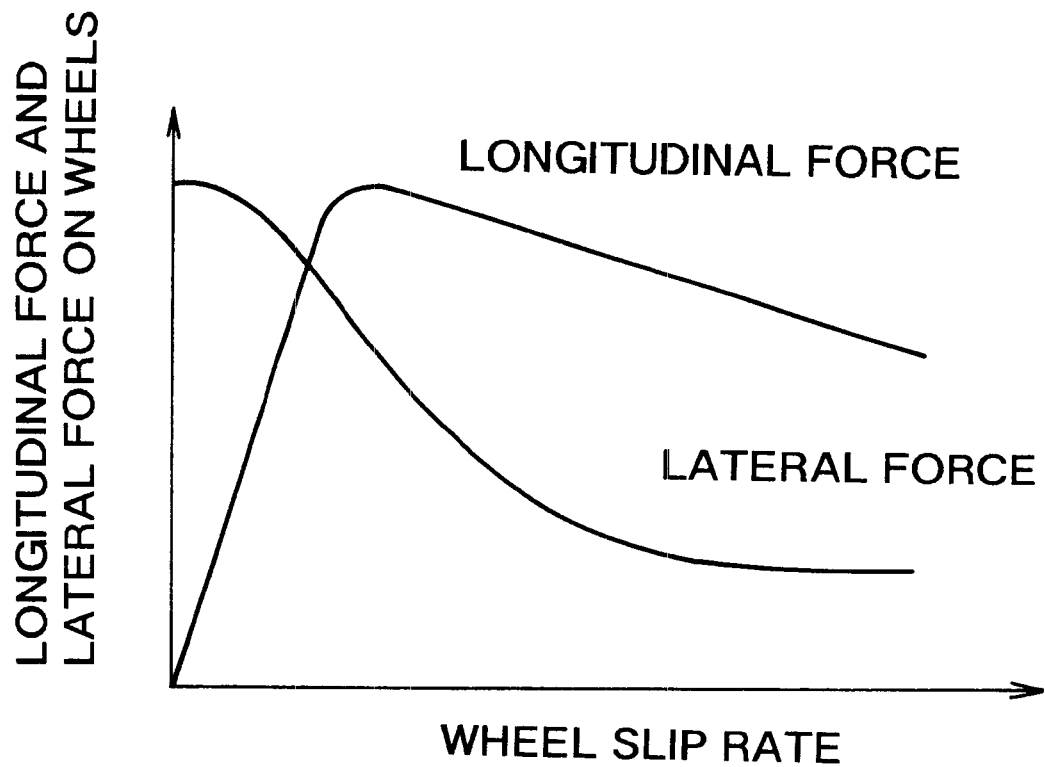
FIG. 7 is a graph showing changes in the longitudinal force and lateral force of wheels with respect to the wheel slip rate.

FIG. 6 is a flowchart illustrating a principal portion of control operations performed by a portion of the hybrid control device 104 that functions as the driving force distribution control device. Namely, the flowchart of FIG. 6 illustrates a driving force distribution control routine or a rear motor-generator control routine. In step S1 of FIG. 6, input signals from various sensors are processed. In the next step S2, a front wheel rotation speed $n_f$ and a rear wheel rotation speed $n_r$ are calculated. Subsequently in step S3 corresponding to the slip rate difference calculating unit 140, an actual slip rate difference sr between the drive wheels, that is, a difference between the slip rate of the front wheels 66, 68 and that of the rear wheels 80, 82, is calculated based on the front wheel rotation speed $n_f$ and the rear wheel rotation speed $n_r$, according to the mathematical expression (1).

Next, in step S4 corresponding to the target slip rate difference determining unit 144, a target slip rate difference $sr_{ref}$ is calculated based on the actual turn angle θ of the front wheels 66, 68, according to the pre-stored relationship as expressed by the above-indicated expression (2). In step S5 corresponding to the target slip rate difference correcting unit 146, the target slip rate difference $sr_{ref}$ obtained in step S4 is corrected based on the vehicle speed correction coefficient determined from the actual vehicle speed V according to the pre-stored relationship as indicated in FIG. 5.

Subsequently in step S6, it is determined which one of the pre-set control modes is presently to be selected. During a vehicle acceleration at a low vehicle speed or during high-speed straight running, for example, it is determined that a driving force distribution control mode is to be selected. During a turn at a high vehicle speed, it is determined that a target yaw rate follow-up control mode, that is, a turn control mode, is to be selected. During straight steady-state running of the vehicle, it is determined that a fuel economy improvement control mode is to be selected.

If step S6 determines that the driving force distribution control mode is currently selected, the control flow proceeds to step S7. In step §7 corresponding to the driving force distribution control unit 152, a rear-wheel required torque distribution ratio $sk_{tr}$ is calculated based on the actual front-rear wheel slip rate difference sr, according to the pre-stored control expression as represented by the mathematical expression (4). By multiplying the total drive torque by the rear-wheel required torque distribution ratio $sk_{tr}$, the output torque of the RMG 70, that is, the torque for driving the rear wheels 80, 82, is calculated. Subsequently in step S10, the rear wheels 80, 82 are driven by the RMG 70 so as to achieve the drive torque value.

If step S6 determines that the target yaw rate follow-up control mode is currently selected, the control flow proceeds to step S8 corresponding to a target yaw rate follow-up control unit. In step S8, a target yaw rate $yaw_{ref}$ is calculated based on the steering angle 8 and the vehicle speed V according to a pre-stored relationship as expressed by mathematical expression (5) below. Furthermore, an estimated yaw rate $yaw_{hat}$ is calculated based on the lateral G (acceleration) gy and the vehicle speed V according to a pre-stored relationship as expressed by mathematical expression (6). Based on the deviation "e" between the target yaw rate $yaw_{ref}$ and the estimated yaw rate $yaw_{hat}$ (=$yaw_{ref}$−$yaw_{hat}$), a rear-wheel required torque distribution ratio $sk_{tr}$ is calculated according to a pre-stored relationship as expressed by mathematical expression (7), such that the deviation "e" is eliminated. Subsequently in step S10, the rear wheels 80, 82 are driven by the RMG 70 so as to achieve the drive torque value thus determined. In the expression (5), "L" represents the vehicle wheelbase, and "kh" represents the vehicle stability factor.

$$yaw_{ref}=\delta \cdot V/[GR \cdot L \cdot (1+kh \times V^2)] \quad (5)$$

$$yaw_{hat}=gy/V \quad (6)$$

$$sk_{tr}=sk_{wr}+P \cdot e+D \cdot de/dt \quad (7)$$

If it is determined in step S6 that the fuel economy improvement control mode is currently selected, that is, in the case where the steering angle δ is not larger than a predetermined value SKDLT, where the front-rear wheel slip rate difference sr is not larger than a predetermined value SKSR, where the vehicle speed V is at least a predetermined value SKV, and where the total driving force is not larger than a predetermined value SKT, the control flow proceeds to step S9 corresponding to a fuel economy improvement control unit. In step S9, a drive command value of the RMG 70 is determined so as to achieve an optimal motor speed that provides an optimal fuel economy in the current vehicle operating conditions. In step S10, the RMG 70 is driven in accordance with the drive command value. For example, the RMG 70 is driven so that the output torque of the RMG 70 becomes zero, rather than a positive value or a negative value.

According to the present embodiment as described above, .the distribution of the driving force between the front and rear wheels is controlled by the driving force distribution control unit 152 (step S7), based on the actual slip rate difference sr calculated by the slip rate difference calculating unit 140 (step S3), so that the current vehicle running state or condition is more accurately reflected by the front-rear wheel driving force distribution. Thus, the driving force is more appropriately distributed, thus assuring a high level of vehicle maneuverability.

In the known vehicular driving force distribution control apparatus as discussed above, the distribution of the driving force between the driving wheels, namely, between the front and rear wheels, is controlled by using a difference between the front wheel rotation speed and the rear wheel rotation speed. The thus obtained driving force distribution does not always sufficiently reflect the vehicle running state or conditions. More specifically, the longitudinal force, which is the frictional force applied from the wheels (i.e., vehicle rubber tires) to the road surface in the vehicle longitudinal direction, rapidly increases at first and then gradually decreases as the wheel slip rate increases. On the other hand, the lateral force, which is the frictional force applied from the wheels to the road surface in the transverse or lateral direction, decreases as the wheel slip rate changes. Therefore, even if the rotation speed difference between the front and rear wheels is the same, the slip state of the front and rear wheels greatly differs depending upon the vehicle speed. For example, even where the rotation speed difference is the same, e.g., is equal to 50 $min^{-1}$ (rpm), different wheel slip rates are obtained when the vehicle speed is 50 km/h and when the vehicle speed is 100 km/h, resulting in different magnitudes of the longitudinal force and lateral force from the wheels and different degrees of the vehicle running stability. Thus, the known vehicular driving force distribution control apparatus may not be able to ensure high vehicle maneuverability.

Furthermore, according to the embodiment, the distribution of the driving force between the front and rear wheels is controlled based on the non-dimensional slip rate difference sr obtained from the mathematical expression (1). Thus, the force distribution control may be applied, with the same control expressions and constants, to other types of vehicles having different tire diameters, different gear ratios of differential gear devices, and so forth.

Still further, according to the embodiment, the driving force distribution control unit 152 (step S7) controls the distribution of the driving force between the front wheels 66, 68 and the rear wheels 80, 82 so that the actual slip rate difference sr calculated by the slip rate difference calculating unit 140 (step S3) becomes equal to the predetermined target slip rate difference $sr_{ref}$. Since the driving force distribution is thus controlled so that the actual slip rate difference sr between the front and rear drive wheels becomes equal to the target slip rate difference $sr_{ref}$, the apparatus of the embodiment is able to promptly achieve more appropriate driving force distribution, as compared with the known apparatus which starts driving force distribution upon detection of racing or slipping of a drive wheel.

Also, the apparatus of the embodiment is further provided with the turned wheel angle calculating unit 148 for calculating the steering angle;of the vehicle, that is, the angle θ of inclination of the front wheels 66, 68 with respect to the vehicle running direction, and the target slip rate difference determining unit 144 (step S4) for determining a target slip rate difference $sr_{ref}$ based on the turn angle θ of the front wheels 66, 68 detected by the turned wheel angle calculating unit 148. Since the target slip rate difference $sr_{ref}$, namely, a target value of the slip rate difference sr, is determined based on the turn angle θ of the wheels, the driving force distribution is appropriately performed upon a start of the vehicle with turned wheels or during running with turned wheels, thus assuring high vehicle maneuverability suitable for the current turned wheel angle.

Still further, the apparatus of the embodiment is provided ,with the target slip rate difference correcting unit 146 (step S5) for correcting the target slip rate difference $sr_{ref}$ determined by the target slip rate difference determining unit 144, based on the vehicle speed V according to the pre-stored relationship. Therefore, even when the center of a turn of the vehicle shifts depending upon the vehicle speed V, the driving force distribution is performed in accordance with the vehicle speed V, thus assuring high vehicle maneuverability suitable for the current vehicle speed V.

Further, according to the embodiment, the target slip rate difference correcting unit 146 (step S5) corrects the target slip rate difference $sr_{ref}$ to a smaller value as the vehicle speed V becomes higher. Therefore, even when the center of a vehicle turn which lies on the rotation axis of the rear wheels shifts toward the front wheels as the vehicle speed increases, an appropriate target slip rate difference can be obtained.

Furthermore, according to the embodiment, the driving force distribution control unit 152 (step S7) controls the driving force distribution using the control expression (mathematical expression (4)), based on the deviation "e" between the target slip rate difference $sr_{ref}$ calculated by the target slip rate difference calculating unit 142 (steps S4, S5) and the actual slip rate difference sr between the drive wheels calculated by the slip rate difference calculating unit 140. The above-indicated control expression (4) includes the feedback control terms for calculating the driving force distribution ratio so as to eliminate the deviation "e", and the feed-forward control term for calculating the driving force distribution ratio based on the weight distribution ratio between the drive wheels. Thus, the driving force distribution between the drive wheels is controlled so as to eliminate the deviation between the target slip rate difference $sr_{ref}$ and the actual slip rate difference sr, thus assuring an improved responsiveness of the driving force distribution.

Further, according to the embodiment, the slip rate difference calculating unit 140 (step S3) calculates the ratio $(n_f-n_r)/n_h$ of the difference $(n_f-n_r)$ between the front wheel rotation speed $n_f$ and the rear wheel rotation speed $n_r$ to the greater value $n_h$ of the front wheel rotation speed $n_f$ and the rear wheel rotation speed $n_r$, as an actual slip rate difference sr. This advantageously eliminates: a need to use the vehicle speed V, which is difficult to accurately measure in a four-wheel drive vehicle, in order to determine a slip rate difference sr. In this connection, in a front-wheel drive (FF) vehicle and a rear-wheel drive (FR) vehicle, the non-driving rear wheels and the non-driving front wheels, respectively, contact with the ground and rotate along with the driving wheels during running of the vehicle. Therefore, a vehicle speed that is approximate to the actual vehicle speed can be determined by detecting the rotation speed of the non-driven wheels. In contrast, a four-wheel drive vehicle has no non-driving wheels that contact with the ground and rotate along with driving wheels, and there is a possibility that the front wheels and the rear wheels, as driving wheels, slip to some extent. It is thus difficult to accurately detect the vehicle speed from the rotation speed of the front wheels or the rear wheels.

Further, according to the embodiment, the rear wheels 80, 82 of the four-wheel drive vehicle are driven by the RMG (electric motor) 70, and the driving force distribution control unit 152 controls the driving force distribution between the front wheels 66, 68 and the rear wheels 80, 82 by controlling the output torque of the electric motor. Therefore, the driving force distribution between the front and rear wheels of the vehicle can be easily controlled.

Further, according to the embodiment, the target slip rate difference calculating unit 142 calculates a target slip rate difference $sr_{ref}$, according to the expression (1−cos θ) where θ is the turn angle of the front wheels 66, 68, which are the steering tire wheels. Therefore, when an actual slip rate difference sr is calculated by the slip rate difference calculating unit 140 according to the expression $(n_f-n_r)/n_h$, it is possible to advantageously eliminate a front-rear wheel slip rate difference that would otherwise automatically arises from the aforementioned expression even if there is no actual slip at the time of a turn of the vehicle, that is, during running with turned or steered wheels.

While the embodiment of the invention has been described in detail with reference to the drawings, the invention may also be embodied in various other manners.

While the four-wheel drive vehicle of the illustrated embodiment is of the type in which the front wheels 66, 68 are driven by a driving motor unit formed by the engine 14 and the MG 16, and the rear wheels 80, 82 are driven by a driving motor unit formed by the RMG 70, the invention may also be applied to, for example, a four-wheel drive vehicle in which the front wheels and the rear wheels are respectively driven by two driving motor units, each of which is formed by one or more driving motor(s) selected from an internal combustion engine, an electric motor, a hydraulic motor and others. The invention may also be applied to a four-wheel drive vehicle of the type in which the driving force is transmitted from a common driving motor(s) to the front wheels and the rear wheels, and is distributed between the front wheels and the rear wheels under control of a torque distribution control clutch. In short, the invention is applicable to any vehicle as long as the vehicle has a first drive wheel set and a second drive wheel set whose driving forces can be separately controlled.

In the four-wheel drive vehicle of the illustrated embodiment, the driving force distribution control unit 152 controls driving force distribution by adjusting the force or torque for driving the rear wheels 80, 82 within a range in which the total driving force does not change. It is, however, possible to control driving force distribution by adjusting the driving force for the front wheels 66, 68 within a range in which the total driving force does not change.

While the embodiment of the invention has been described above with reference to the drawings, the embodiment is merely one form of carrying out the invention. It is to be understood that the invention may be otherwise embodied with various changes, modifications or improvements that would occur to those skilled in the art, without departing from the scope of the appended claims.

What is claimed is:

1. A driving force control apparatus of a motor vehicle including a first set of drive wheels and a second set of drive wheels which are driven with respective driving forces that are controlled independently of each other, comprising:

a slip rate difference calculating unit configured to calculate an actual slip rate difference between a slip rate of the first set of drive wheels and a slip rate of the second set of drive wheels, wherein the sliprate sr is defined by:

$$sr=(n_f-n_r)n_h,$$

where $n_f$ is the rotation speed of the first set of drive wheels, $n_r$ is the rotation speed of the second set of drive wheels and $n_h$ is the greater value of $n_f$ and $n_r$; and a driving force distribution control unit configured to control distribution of driving force between the first set of wheels and the second set of wheels, based on the slip rate difference calculated by the slip rate difference calculating unit.

2. A driving force distribution control apparatus according to claim 1, further comprising a target slip rate difference calculating unit configured to calculate a target slip rate difference between a slip rate of the first set of drive wheels and a slip rate of the second set of drive wheels, wherein the driving force distribution control unit is configured to control distribution of the driving force between the first set of wheels and the second set of wheels so that the actual slip rate difference calculated by the slip rate difference calculating unit becomes substantially equal to the target slip rate difference calculated by the target slip rate difference calculating unit.

3. A driving force distribution control apparatus according to claim 2, wherein the first set of drive wheels are front wheels of the vehicle, and the second set of drive wheels are rear wheels of the vehicle.

4. A driving force distribution control apparatus according to claim 3, further comprising a turned wheel angle calculating unit configured to detect a turned angle of vehicle wheels with respect to a running direction of the vehicle,
wherein the target slip rate difference calculating unit comprises a target slip rate difference determining unit configured to determine the target slip rate difference based on the turned angle of the wheels detected by the turned wheel angle calculating unit.

5. A driving force distribution control apparatus according to claim 4, wherein the target slip rate difference calculating unit further comprises a target slip rate difference correcting unit configured to correct the target slip rate difference determined by the target slip rate difference determining unit, based on a vehicle speed, in accordance with a pre[]stored relationship with the vehicle speed.

6. A driving force distribution control apparatus according to claim 5, wherein the target slip rate correcting unit is configured to correct the target slip rate difference to a smaller value as. the vehicle speed increases.

7. A driving force distribution control apparatus according to claim 3, wherein the slip rate difference calculating unit is configured to calculate the actual slip rate difference based on a rotation speed of the front wheels and a rotation speed of the rear wheels.

8. A driving force distribution control apparatus according to claim 3, wherein the rear wheels are driven by an electric motor, and wherein the driving force distribution control unit is configured to determine a rear-wheel required torque distribution ratio that represents the ratio of a required torque for driving the rear wheels to a total drive torque, and controls the electric motor based on the rear-wheel required torque distribution ratio.

9. A driving force control method of a motor vehicle including a first set of drive wheels and a second set of drive wheels which are driven with respective driving forces that are controlled independently of each other, comprising the steps of:
calculating an actual slip rate difference between a slip rate of the first set of drive wheels and a slip rate of the second set of drive wheels, wherein the sliprate sr is defined by:

$$sr = (n_f - n_r)/n_h,$$

where $n_f$ is the rotation speed of the first set of drive wheels, $n_r$ is the rotation speed of the second set of drive wheels and $n_h$ is the greater value of $n_f$ and $n_r$; and
controlling distribution of driving force between the first set of wheels and the second set of wheels, based on the calculated slip rate difference.

10. A driving force control method according to claim 9, further comprising the step of calculating a target slip rate difference between a slip rate of the first set of drive wheels and a slip rate of the second set of drive wheels,
wherein the distribution of the driving force between the first set of wheels and the second set of wheels is controlled so that the actual slip rate difference becomes substantially equal to the target slip rate difference.

11. A driving force control method according to claim 10, wherein the first set of drive wheels are front wheels of the vehicle, and the second set of drive wheels are rear wheels of the vehicle.

12. A driving force distribution control method according to claim 11, further comprising the step of detecting a turned angle of vehicle wheels with respect to a running direction of the vehicle,
wherein the step of calculating a target slip rate difference comprises a sub-step of determining the target slip rate difference based on the turned angle of the vehicle wheels.

13. A driving force distribution control apparatus according to claim 12, wherein. the step of calculating a target slip rate difference further comprises a sub-step of correcting the target slip rate difference determined based on the turned angle of the vehicle wheels, based on a vehicle speed in accordance with a pre-stored relationship with the vehicle speed.

14. A driving force distribution control apparatus according to claim 13, wherein the target slip rate difference is corrected to a smaller value as the vehicle speed increases.

15. A driving force distribution control apparatus according to claim 11, wherein the actual slip rate difference is calculated based on a rotation speed of the front wheels and a rotation speed of the rear wheels.

16. A driving force distribution control apparatus according to claim 11, wherein the rear wheels are driven by an electric motor, and wherein the electric motor is controlled based on a rear-wheel required torque distribution ratio that represents the ratio of a required torque for driving the rear wheels to a total drive torque.

17. A driving force control apparatus of a motor vehicle including a first set of drive wheels and a second set of drive wheels which are driven with respective driving forces that are controlled independently of each other, comprising:
slip rate difference calculating means for calculating an actual slip rate difference between a slip rate of the first set of drive wheels and a slip rate of the second set of drive wheels, wherein the sliprate sr is defined by:

$$sr = (n_f - n_r)/n_h,$$

where $n_f$ is the rotation speed of the first set of drive wheels, $n_r$ is the rotation speed of the second set of drive wheels and $n_h$ is the greater value of $n_f$ and $n_r$; and
driving force distribution control means for controlling a distribution of driving force between the first set of wheels and the second set of wheels, based on the slip rate difference calculated by the slip rate difference calculating means.

18. A driving force distribution control apparatus according to claim 17, further comprising target slip rate difference calculating means calculating a target slip rate difference between a slip rate of the first set of drive wheels and a slip rate of the second set of drive wheels,
wherein the driving force distribution control means controls distribution of the driving force between the first set of wheels and the second set of wheels so that the actual slip rate difference calculated by the slip rate difference calculating means becomes substantially equal to the target slip rate difference calculated by the target slip rate difference calculating means.

19. A driving force distribution control apparatus according to claim 18, wherein the first set of drive wheels are front wheels of the vehicle, and the second set of drive wheels are rear wheels of the vehicle.

20. A driving force distribution control apparatus according to claim 19, further comprising a turned wheel angle calculating means for detecting a turned angle of vehicle wheels with respect to a running direction of the vehicle, wherein the target slip rate difference calculating means comprises a target slip rate difference determining means for determining the target slip rate difference based on the turned angle of the wheels detected by the turned wheel angle calculating means.

21. A driving force distribution control apparatus according to claim 20, wherein the target slip rate difference calculating means further comprises a target slip rate difference correcting means for correcting the target slip rate difference determined by the target slip rate difference determining means, based on a vehicle speed, in accordance with a pre-stored relationship with the vehicle speed.

22. A driving force distribution control apparatus according to claim 21, wherein the target slip rate correcting means corrects the target slip rate difference to a smaller value as the vehicle speed increases.

23. A driving force distribution control apparatus according to claim 19, wherein the slip rate difference calculating means calculates the actual slip rate difference based on a rotation speed of the front wheels and a rotation speed of the rear wheels.

24. A driving force distribution control apparatus according to claim 19, wherein the rear wheels are driven by an electric motor, and wherein the driving force distribution control means determines a rear-wheel required torque distribution ratio that represents the ratio of a required torque for driving the rear wheels to a total drive torque, and controls the electric motor based on the rear-wheel required torque distribution ratio.

* * * * *